Figure 1:
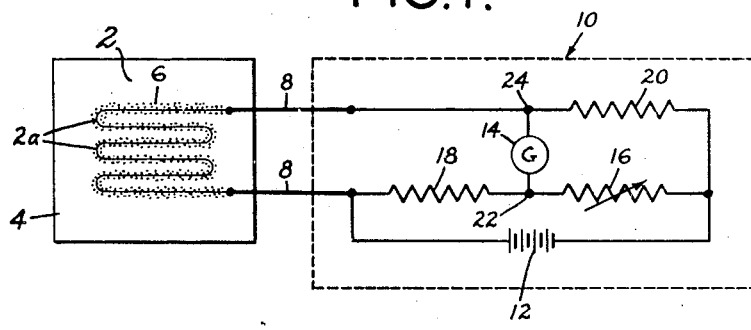

Feb. 8, 1949.  P. CILLEY  2,461,310
APPARATUS FOR MEASURING HUMIDITY
Filed May 21, 1947

INVENTOR.
PUTNAM CILLEY
BY
*Blair, Curtis & Hayward*
ATTORNEYS.

Patented Feb. 8, 1949

2,461,310

UNITED STATES PATENT OFFICE 2,461,310

APPARATUS FOR MEASURING HUMIDITY

Putnam Cilley, Sharon, Mass., assignor to The Foxboro Company, Foxboro, Mass., a corporation of Massachusetts Application May 21, 1947, Serial No. 749,437

5 Claims. (Cl. 73—335)

This invention relates to apparatus for measurement of humidity.

Heretofore only a limited number of methods of measuring the humidity, absolute or relative, of the atmosphere have been used. Even these are subject to many disadvantages.

Chemical methods of measuring absolute humidity, such as that of passing a known volume of the moisture-laden gas through a tube filled with a hygroscopic salt and noting the increase in weight of the salt or the decrease in volume or pressure of the gas, are impractical for many industrial applications because they are not adapted for continuous operation, and because of the considerable time consumed in thus processing each batch of gas.

The dew point method of measuring absolute humidity is likewise not a continuously indicating process, but necessitates the successive steps of lowering the temperature of a vessel, as by bubbling air through ether contained therein, until moisture from the atmosphere condenses on the outer walls of the vessel, allowing its temperature to increase until this dew is reabsorbed, averaging the two temperature readings so obtained, and consulting a table to determine the absolute or relative humidity. It is also difficult to estimate with accuracy the point of appearance and disappearance of the condensate.

The most commonly used means of measuring relative humidity is perhaps the hair hygrometer, in which the hygroscopic changes in length of a human hair move the pointer of a dial or the pen of a recorder through a simple linkage. Other animal membranes or filaments or vegetable fibers, such as cat gut, cloth, wood, etc., may be similarly employed.

Since in all of such mechanical devices, the sensitive element is under tension, it necessarily must have sufficient body to withstand this tension. This bulk causes the element to exhibit a delay in absorbing and releasing moisture and a marked hysteresis, particularly over wider ranges of relative humidity.

The commonly used psychrometer, or wet-and-dry-bulb hygrometer, in which the difference between the readings of a thermometer in free air and one whose bulb is encased in a water-saturated wick affords, with reference to suitable tables, an indication of relative or absolute humidity, requires mechanism to insure adequate flow of air over the wick of the wet bulb. A draft may be created by whirling the thermometers through the air ("sling" psychrometer), or by the use of a fan ("aspirating" psychrometer); the former expedient deprives the device of its continuously indicating advantage and may introduce errors due to the centrifugal forces imposed, while the latter necessitates additional equipment.

Accordingly, among the objects of this invention is provision of apparatus for the measurement of humidity which will give a continuous indication thereof, and which will rapidly and accurately measure changes in ambient humidity over a wide range without disadvantage present in conventional methods. It is also an object to provide economical and easily maintainable apparatus for efficiently performing the functions set out above. Other objects will be in part pointed out and in part implicit herein.

Figure 2:
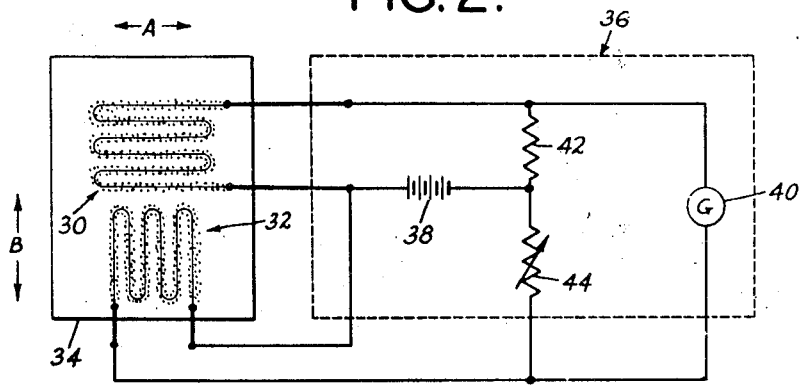

Referring to the drawings,

Figure 1 is a partly schematic view of an illustrative novel embodiment for carrying out the method of my invention; and Figure 2 is a partly schematic view of another embodiment.

The device portrayed in Figure 1 comprises an electrical resistance element 2 bent to form a plurality of elongated loops 2a and bonded to a sheet of hygroscopic material 4 by cementing as at 6. Resistance element 2 is connected through a pair of supporting conductors 8 into a resistance measuring circuit, indicated generally at 10. Various resistance measuring circuits known in the art may be used, but for purposes of illustration a simple Wheatstone bridge is shown. To obtain greater accuracy it may be desirable in some instances to use a more elaborate measuring device, such as that disclosed in the copending application of Wilfred H. Howe and Robert Cushman, Serial No. 496,438, filed July 28, 1943.

In the illustrative circuit 10, the potential of the battery 12 is applied across a variable resistance 16 and a fixed resistance 18 in series and across fixed resistances 20 and 2 in series. The galvanometer 14 connected between point 22 at the junction of resistances 16 and 18 and point 24 at the junction of resistances 20 and 2 will read zero when the ratio of the resistances 16 and 18 is equal to that of resistances 20 and 2. When variable resistor 16 is adjusted for zero reading of galvanometer 14, the resistance of element 2 may be readily calculated from the known resistances of resistors 16, 18 and 20.

Variation of the ambient relative humidity produces changes in the moisture content and physical dimensions of hygroscopic sheet 4 which in turn applies physical strain to element 2, thereby varying its electrical resistance. An increase in relative humidity, for example, causes expansion of sheet 4; element 2 is thus lengthened and, by Poisson effect, its cross-sectional area diminished; these effects combine to increase its electrical resistance. A decrease in relative humidity affects the device oppositely. Thus the resistance of element 2, which is measured by circuit 10 as hereinbefore described, affords an indication of the relative humidity of the atmosphere. To facilitate measurement, variable resistor 16 may be provided with a dial calibrated directly in terms of relative humidity. Or, more advantageously, use of an indicating and recording instrument such as that described in said copending application will afford a continuous graphic plot of relative humidity against time.

Although sheet 4 may be composed of any of a number of hygroscopic substances, paper has been found to be a thoroughly acceptable material. Various types of paper, and even light cardboard, Cellophane and photographic film have also been tried and proven usable, though of course, where a direct-reading measuring instrument is used, it must be calibrated according to the material employed.

Since the sensitive member is in the form of a sheet, it has a very high ratio of surface area to volume. This allows it to admit and release moisture with great rapidity. Even an extremely thin sheet possesses sufficient strength to strain the fine wire of element 2.

It has been found that the characteristics of the instrument are independent of the size and shape of the sheet: that is, element 2 is apparently not affected by portions of the sheet remote thereto.

Likewise, the sheet may be mounted in any of several different ways without altering its performance. One acceptable method of mounting the sheet is to secure its edges to an open rectangular frame, as with tape, the sheet being laid down flat but not taut. An even simpler method which has worked successfully is to support the sheet along one side and allow it to hang free; this, of course, necessitates use for the sheet of a paper subject to negligible curl; also, it requires that the sheet be suspended in a location protected from air currents strong enough to cause appreciable bending of the sheet.

Element 2 may be formed of any of a number of suitable materials, such as elinvar, constantan or "Advance"; its diameter is of the order of .001", though it may suitably range from, say, .00025" to .004".

In the models constructed, satisfactory results have been achieved with element 2 bent to form three loops, as shown, the parallel courses being 1" long and being spaced apart ⅛". Ordinary Duco cement was used to bond element 2 to sheet 4, taking care to minimize the quantity of cement used and the are of the sheet covered thereby. The layer of cement on the sheet slightly retards the admission and release of moisture; however, since the cement does not penetrate deeply into the sheet, and since the uncoated back of the sheet is exposed to the atmosphere, the expansion and contraction of the portion of the sheet immediately local to the element 2 is but slightly diminished. The resistance of the mass of cement to the expansion and contraction of the sheet likewise is overcome without excessive reduction of the theoretically available dimensional change.

Rigid supporting conductors 8 facilitate the handling of sheet 4 and the making of electrical connections with element 2.

Changes in ambient temperature likewise produce an effect on the resistance of element 2. For this reason, it is desirable that resistor 18 have a temperature coefficient of resistance substantially equal to that of element 2, and that it be exposed to the same conditions of temperature as is element 2. If these requisites are observed, any change in resistance of element 2 due to temperature variation will be counteracted by a corresponding change in resistance of resistor 18.

In Figure 2 is illustrated a modified embodiment comprising a sheet 34 of material having anisotropic humidity-expansion characteristics—that is, when exposed to an increase in relative humidity, sheet 34 expands more in the direction indicated by arrow "A" than in the direction of arrow "B." A pair of resistance elements, 30 and 32, similar to element 2 in Figure 1, are bonded to sheet 34 in such manner that their principal axes are at right angles, the courses of element 30 being parallel to the direction of arrow "A" and those of element 32 being aligned with arrow "B." An increase in relative humidity thus will produce a greater increase in the resistance of element 30 than in element 32.

A comparison of the circuit diagram of the device portrayed in Figure 2 with that of Figure 1 will reveal that the two are electrically similar: in circuit 36, the potential of battery 38 is applied across element 30 and resistor 42 in series and across element 32 and resistor 44 in series; galvanometer 40 will detect a current dependent upon the difference between the resistance ratios of element 30 to resistor 42 and element 32 to resistor 44. Thus, since elements 30 and 32 are identically constructed and are always exposed to the same conditions of temperature, the change of resistance of element 30 due to temperature variation will be exactly offset by a corresponding temperature-responsive change in resistance of element 32. The indicating or recording circiut thus will detect only the difference in resistance of elements 30 and 32 due to anisotropic expansion and contraction of sheet 34 with changes in humidity. This difference in resistance of elements 30 and 32 is substantially linear throughout the middle range of relative humidity.

Paper produced on a Fourdrinier machine exhibits a markedly greater humidity-responsive expansion in the direction across the machine than therealong; it therefore has proven an altogether suitable material for forming sheet 34, although of course any of a number of other substances having the necessary anisotropy may be employed.

Tests of these devices have shown them to be very sensitive and rapid in response; blowing of breath on the sheet, for example, is sufficient to produce an immediate sharp deflection of the indicating meter or recorder. They are also stable in calibration over long periods of usage. Moreover, when used with a standard resistance indicator-recorder as hereinbefore described, they afford a continuous, direct-reading measurement of relative humidity.

Although the foregoing discussion has made principal reference to the measurement of atmospheric humidity, the devices described are capable of other analogous applications, for example, that of measuring the moisture content of a material being processed, such as a running web of paper in a paper machine. If the sheet bearing the sensitive elements is enclosed in a small chamber having one open side, such as is described in U. S. Patent No. 2,359,278 to Albert Allen and Wilfred H. Howe, and the chamber placed adjacent the web with its open side facing the web, the vapor pressure of the moisture in the running web and in the sensitive sheet will be in equilibrium with the pressure of the vapor in the chamber. Thus, by measuring the moisture content of the sensitive sheet, we may obtain a measure of the moisture content of the running web.

The present invention is unusually well adapted to such applications, since an extraordinary degree of accuracy may be achieved by using as the sensitive sheet a sample of the material being processed. This assures that the moisture content of the processed material and of the sensitive sheet will be equal at all times, despite irregularities in the former's characteristics of moisture content versus relative humidity. Since any of a wide variety of hygroscopic materials may be used as the sensitive sheet, this identity of sensitive sheet and processed material may be established in many different types of application, for example, in the manufacture of photographic film.

There will thus be seen to have been provided methods and devices whereby the aforementioned and other desirable objects may be accomplished. While but two embodiments have been shown, it will be understood that these are not to be interpreted as restrictive, but as merely illustrative of the invention.

I claim:

1. A humidity measuring device comprising, in combination, a sheet of hygroscopic material that expands and contracts in response to variations in humidity of an atmosphere to which it is exposed, an electrical resistance element bonded to said sheet whereby changes in the dimensions of said sheet produce changes in the dimensions and electrical resistance of said element, and an electrical resistance measuring circuit connected to said element to measure the resistance of said element as a measure of the humidity of said atmosphere.

2. A humidity measuring device including a sheet of hygroscopic material, a first electrical resistance element bonded to said sheet whereby changes in ambient humidity vary the dimensions of said sheet and the dimensions and electrical resistance of said first element, a second electrical resistance element having a temperature coefficient of resistance substantially equal to that of said first element and exposed to the same conditions of temperature as the first, and an electrical resistance measuring circuit connected to said resistors and adapted to indicate the influence of humidity and temperature on the resistance of the first element less the effect of temperature on the resistance of the second.

3. A humidity measuring device including a sheet of hygroscopic material having anisotropic characteristics of dimensional change with change in moisture content, a pair of electrical resistance elements bonded thereto with the principal axes of said elements offset from each other whereby changes in ambient humidity produce anisotropic expansion of said sheet and unequal distortion and changes in resistance of said elements, whereas changes in temperature produce equal changes in resistance thereof, and an electrical resistance measuring circuit connected to measure the relative resistance of said elements as a measure of ambient humidity.

4. In a device for measuring the condensible vapor content of an atmosphere the combination of a member having a physical attraction for said vapor and whose moisture content varies directly in response to the vapor content of an atmosphere to which the member is exposed, and whose dimensions vary directly with its moisture content, a conductor mechanically secured to said member and adapted to be strained thereby in a degree proportionate to the dimensional change of said member, said electrical conductor having electrical resistance which measurably changes with change of strain of the conductor, and an electrical resistance measuring circuit connected across said conductor to measure the resistance thereof as a measure of the vapor content of said atmosphere.

5. An article as claimed in claim 1 wherein said hygroscopic member is supported in such manner as not to be under tension.

PUTNAM CILLEY.

REFERENCES CITED

The following references are of record in the file of this patent:

UNITED STATES PATENTS

| Number | Name | Date |
|---|---|---|
| 1,749,826 | Lubach | Mar. 11, 1930 |
| 1,781,153 | Allen | Nov. 11, 1930 |
| 2,177,558 | Callan | Oct. 24, 1939 |
| 2,400,467 | Ruge | May 14, 1946 |